United States Patent [19]

Stannard et al.

[11] 4,208,288
[45] Jun. 17, 1980

[54] FILTERING APPARATUS

[75] Inventors: Forrest B. Stannard, Ft. Lauderdale; Edward J. Highstreet, Coral Springs, both of Fla.

[73] Assignee: The De Hydro Corporation, Ft. Lauderdale, Fla.

[21] Appl. No.: 967,202

[22] Filed: Dec. 7, 1978

[51] Int. Cl.$^2$ ................... B01D 23/10; B01D 25/22
[52] U.S. Cl. ..................................... 210/277; 210/279
[58] Field of Search ................ 210/20, 263, 264, 266, 210/268, 283, 284, 290, 291, 292, 293, 314, 317, 456, 500 M, 502–505, 510, 80, 67, 279, 277

[56] References Cited

U.S. PATENT DOCUMENTS

| | | | |
|---|---|---|---|
| 651,173 | 6/1900 | Weaver | 210/264 |
| 654,479 | 7/1900 | McNally | 210/264 |
| 1,277,832 | 9/1918 | Beckley | 210/293 |
| 3,538,020 | 11/1970 | Heskett et al. | 210/510 |
| 3,957,647 | 5/1976 | Jones | 210/290 |

Primary Examiner—Frank Sever
Attorney, Agent, or Firm—Carroll F. Palmer

[57] ABSTRACT

Filter apparatus for removing fine solids from aqueous effluents, e.g., waste water filtration, comprises horizontal upper and lower rigid filter plates formed of aggregate fixed in a matrix of cured organic resin defining therebetween a secondary filter zone containing loose filter media, first and second fluid confining chambers above and below said filter plates respectively from which liquid can flow through the filter plates, a vertical conduit for conducting liquid from beneath the lower filter plate for discharge into the first chamber through an opening in the upper filter plate, conduits for inlet and outlet of liquid to said secondary filter zone and second chamber and a sparger to spray wash water on the top surface of the upper filter plate. In a filtering mode, the liquid suspension to be filtered flows into the first chamber via said vertical conduit and then passes, in turn, through the upper filter plate, the filter zone, the lower filter plate and the second chamber to discharge therefrom. In a washing mode, wash water from the sparger cleans the filter cake from the upper filter plate forming a slurry that discharges from the apparatus via the vertical conduit. Wash water to cleanse the lower plate and the filter media in the secondary filter zone is introduced into the second chamber to flow, in turn, through the lower filter plate, the filter zone and the upper filter plate to discharge via the vertical conduit. The new methods and apparatus remove solids with high efficiency while reducing ten fold or more wash water requirements as compared with prior art granular media filtration methods and apparatus.

5 Claims, 6 Drawing Figures

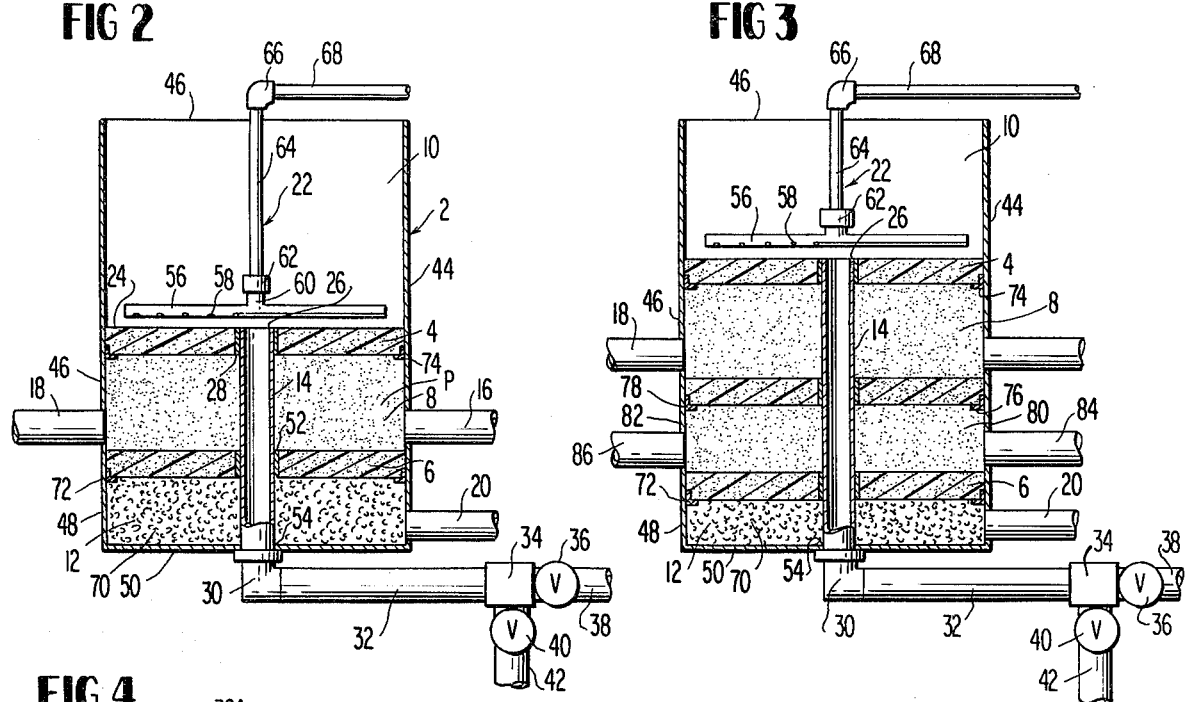
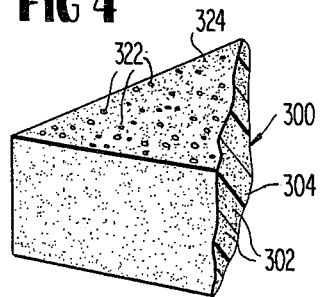
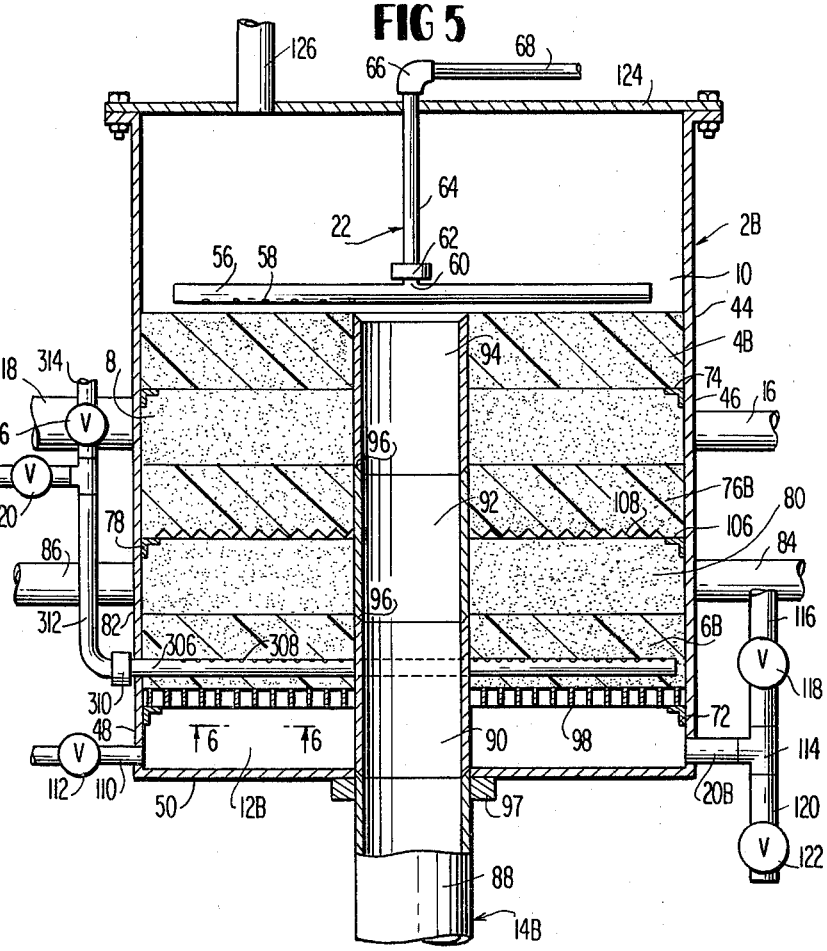
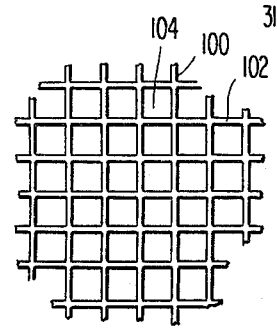

FILTERING APPARATUS

BACKGROUND OF THE INVENTION

1. Field of the Invention

This invention broadly relates to filtering methods and apparatus. More particularly, it concerns the removal of solids of small size from aqueous suspensions, e.g., waste water treatment effluent, by methods that can remove the undesired solids with an effectiveness at least as good as the prior art while reducing up to 80% the wash water normally required for the wash cycle and apparatus to perform such methods.

2. Description of the Prior Art

The efficient removal of low concentration, suspended solids (LCSS) present at relatively low concentration in aqueous suspension to produce an effluent meeting quality standards is a continuing problem in waste water treatment. Many other liquid treatment operations, e.g., potable water production involving removal of solids present in surface waters pretreated by coagulation and sedimentation, also present design engineers with the same problem.

Granular media filtration (GMF) in an established method used in solids removal from potable water (see W. J. Weber, Jr., *Physicochemical Processes for Water Quality Control*, Wiley Interscience, N.Y.N.Y., 1972). GMF is also used in advance waste water treatment for removal, inter alia, of residual biological floc in settled effluents from secondary treatments, so called "tertiary filtration". Basically, such operations involve the use of six different configurations for the granular media filters, namely, (a) conventional sand bed, (b) dual media, (c) triple (mixed) media, (d) single medium unstratified, (e) upflow or immedium and (f) bi-flow (see EPA publication 625/4-74-007a on *Wastewater Filtration—Design Considerations*—Rev. 1977, pps. 8-11). In addition to such established filtration methods, there are various proprietary filter methods and equipment used for LCSS removal (see EPA publication 625/1-75-003a on *Process Design Manual for Suspended Solids Removal*—1975 and U.S. No. Re. 28,458; 3,587,861 and 3,840,117.)

As is well known by design engineers and others concerned with LCSS removal from aqueous suspensions, a variety of difficulties serve to reduce the efficiency and increase the costs of such operations. For example, as filtration progresses, suspended solids collect on the surface and/or interior of the filtration unit causing headloss development. When the headloss exceeds desirable operating level, removal of filtered solids by backwashing or other means becomes necessary to restore the effectiveness of the filter system. In the established types of GMF mentioned above, relatively large amounts of wash water are required. Since the wash water contains the suspended solids removed from the filter media, it is generally recycled in the system to capture such solids. This hydraulic loading of the aqueous treatment system reduces its overall capacity and increases costs of operation. Special wash water handling systems have been developed in an attempt to mitigate this problem (see U.S. Pat. No. 3,792,773).

Another problem with GMF arises when backwashing is not properly controlled since serious damage can occur to the filter bed, e.g., "blowing" of the bed or intermixing of media. Even if such damage does not result, backwashing time is unproductive of quality effluent and the longer it is, the lower is the overall efficiency of the filtering operation.

Even though the art of LCSS removal from aqueous suspensions by filtration has been highly developed through many years of usage coupled with continued design changes, there continues to exist a need for further improvements in such methods and apparatus to reduce equipment, operating and maintenance costs, reduce wash water volume and time requirements and improve overall efficiency.

In the proprietary filter methods developed heretofore, it has been known to use rigid filter modules (RFM), i.e., rigid plates, sheets or the like formed of particulate aggregate fixed in a matrix of inorganic ceramic or organic resin (see U.S. Pat. No. 1,576,440). While such RFM have been used in the prior art for special purposes, e.g., filtering hydrofluoric acid and other acid solutions, they have not been utilized in LCSS filtration. The present invention provides RFMs of unique construction and provides new methods for LCSS removal from aqueous suspensions using such new filter media.

OBJECTS

A principal object of the present invention is the provision of new filtering methods and apparatus. Further objects include:

1. Provision of LCSS filtering methods that substantially reduce capital and operational costs as compared to prior known methods.
2. Provision of improved filtering methods and apparatus adaptable to a wide variety of industrial applications in addition to waste water treatment and potable water production.
3. Elimination of costly media replacement or recharging as associated with GMF operations.
4. Reduce the amount of piping and valves, eliminate wash water troths and attain other construction reductions as compared with conventional methods of LCSS filtration.
5. Reduce up to 80% the amount of wash water normally required in conventional methods of LCSS filtration.
6. Reduce hydraulic loading of plant influent with wash water in LCSS filtrations.
7. Eliminate the need for wash water return tanks.
8. Provision of filter apparatus comprising secondary filter zones in which filter media can be easily introduced or removed to allow for rapid change to specialized removal media or for cleansing the filter media.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished according to the present invention by improved filtering apparatus which comprises an upper rigid horizontal filter module (RFM), lower rigid horizontal filter module, a secondary filter zone capable of retaining a mass of loose particles of filter material, such zone being defined at the top by the upper RFM, at the bottom by the lower RFM and on the sides by solid side walls, a first chamber to contain liquid above the upper RFM with the base of the first chamber being the upper RFM, a second chamber to contain liquid below the lower RFM with the roof of the second chamber being the lower RFM, a vertical conduit for conducting liquid from a source external of the apparatus and discharging it, through an opening in the upper RFM the size of the vertical conduit, into the first chamber, liquid conduits for inlet and outlet of liquid to and from the secondary filter zone and the second chamber, and sparger means to spray wash water on the top surface of the upper RFM.

Preferably, the upper and lower RFMs are plates formed of crushed anthracite or equivalent aggregate fixed in a matrix of cured organic resin. Advantageously, the aggregate is of size between about 5 to 35, preferably 10 to 18 mesh measured by U.S. Standard Sieve Series (1940). Preferably, the organic resin is an epoxy resin and the plates are between about 1 to 5 centimeters in thickness.

The foregoing objects are further accomplished according to the present invention by improved filtering methods that comprise providing a filtering system having a first horizontal RFM as the bottom of a liquid holding chamber, flowing influent to be filtered into said chamber through a vertical conduit that discharges into the chamber through a central opening in the RFM, allowing the influent to pass through the RFM from the chamber, discharging effluent from the filter system at a level below the RFM, discontinuing the flowing of influent into the chamber, emptying the chamber to begin a washing cycle, spraying water onto the RFM from above it to wash filter cake therefrom and discharging wash water effluent from the filtering system through the vertical conduit previously used to introduce influent into the system.

In a preferred form of the new methods, effluent through the RFM is passed in order through a filtering zone containing loose particles of filtering media and through a second horizontal RFM before discharge from the filtering system. Also in such case, wash water may be passed upwardly through the RFMs and the filtering zone during water spraying in the washing cycle, and, additional air may be blown upwardly together with the upward passage of wash water.

BRIEF DESCRIPTION OF THE DRAWINGS

A more complete understanding of the invention can be obtained by reference to the accompanying drawings in which:

FIG. 2 is a lateral, sectional view of a basic form of filtering apparatus of the invention.

FIG. 3 is a lateral, sectional view of a modified form of filtering apparatus of the invention.

FIG. 4 is a fragmentary, isometric view of a rigid filter plate formed in accordance with the invention.

FIG. 5 is a lateral, sectional view of another embodiment of filtering apparatus of the invention.

FIG. 6 is a fragmentary, sectional view taken on the line 6—6 of FIG. 5.

DESCRIPTION OF PREFERRED EMBODIMENTS

Figure 1:
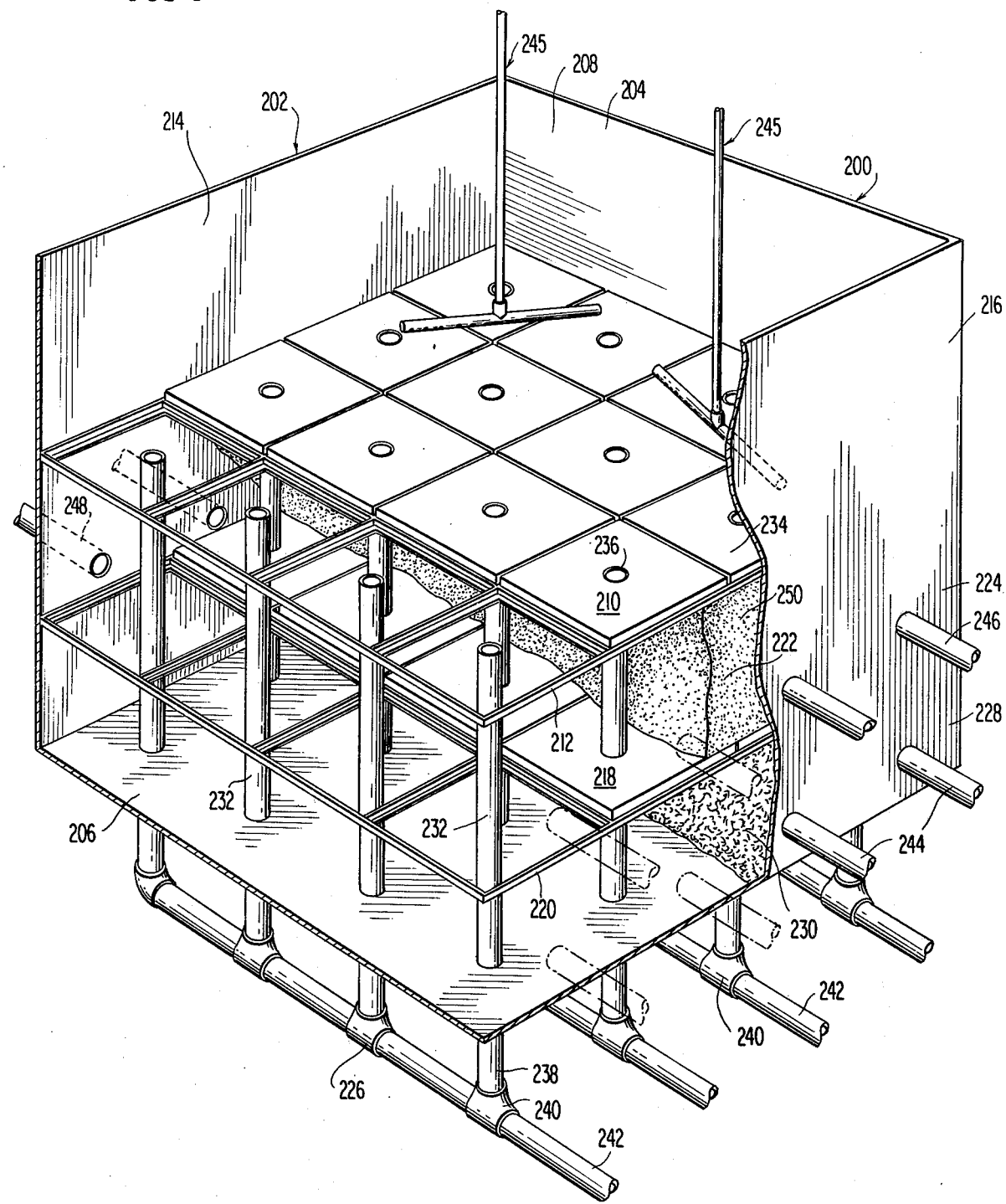
FIG. 1 is an isometric view, partially broken away, of filtering apparatus constructed in accordance with the invention.

Referring in detail to the drawings, with initial reference to FIG. 2, the filtering system 2 basically comprises an upper horizontal rigid filter plate 4, a lower horizontal rigid filter plate 6, a secondary filter zone 8, a liquid holding chamber 10, a liquid containing chamber 12, a vertical liquid conduit 14, liquid conduits 16 and 18 for liquid ingress to and egress from zone 8, liquid conduit 20 for liquid ingress to and egress from chamber 12 and sparger means 22 to spray water on the top surface 24 of upper filter plate 4.

The upper end 26 of the conduit 14 terminates substantially at the level of the upper surface 24 of filter plate 4 and extends through a hole 28 about equal in ID to the OD of the conduit 14. Advantageously, the hole 28 is located about the center of filter plate 4 although it may be located at other positions, particularly where the plate 4 is an extensive area and a plurality of conduits 14 extend vertically thereinto. If desired, the conduit 14 may be sealed by suitable cement into the hole 28 or, alternatively, caulking or the like may be used to seal any space that may exist between the inside of hole 28 and the outside of conduit 14.

The conduit 14 is joined via elbow 30, the conduit 32, T-joint 34, valve 36 and conduit 38 to a source of influent (not shown). Such influent may be, for example, waste water to be filtered in the system 2 or wash water to clean the plate 4 and other portions of the system 2.

The conduit 14 is also arranged via valve 40 and conduit 42 for discharge of wash water from the system 2 to recycle in a water treatment plant (not shown) or to some other arrangement for handling or disposing of wash water containing waste material.

In the basic form of the filtering system 2 as shown in FIG. 2, the bottom of chamber 10 is formed by the top 24 of the filter plate 4 and it has side walls 44 and an open top 46. Also, the filter zone 8 is defined at the top by the upper filter plate 4, at the bottom by the lower filter plate 6 and at the sides by solid side walls 46 that, advantageously, are integral with the side walls 44 of chamber 10.

The liquid containing chamber 12 has as its top the filter plate 6, side walls 48, advantageously integral with the walls 46 and 44 and a horizontal bottom 50. The conduit 14 extends through a hole 52 in the filter plate 6 and a hole 54 in the bottom 50. Sealing or other joining of conduit 14 to holes 52 and 54 may be obtained as explained in connection with hole 28.

The sparger means 22 comprises a horizontal tube 56 with holes 58 in one side thereof and a vertical nipple 60. The nipple 60 is rotatably carried in the bushing 62 fixed at the lower end of the pipe 64. Pipe 64 is, in turn, connected via elbow 66 and pipe 68 to a source of wash water (not shown). Water flowing via pipes 68 and 64 to the ported tube 56 will cause the tube 56 to rotate and, at the same time, to spray water onto the top surface 24 of the filter plate 4.

In the filter system 2 of FIG. 2, the chamber 12 is packed with gravel or crushed stone 70 which acts as a support for the filter plate 6 across its entire area. In addition, the plate 6 may be supported at its bottom periphery by the angle members 72. Similarly, the plate 4 may be supported upon angle members 74 that, like members 72, may be fixed by welding, fasteners or the like to the inner surface of walls 46 and 48.

The filter system 2A of FIG. 3 is basically similar to the filter system 2 of FIG. 1. It differs therefrom by the addition of a third horizontal rigid filter plate 76, supported by angle members 78, and the additional filter zone 80 defined at the top by the filter plate 76, at the bottom by the filter plate 6 and at the sides by the solid walls 82 that are integral with the walls 44, 46 and 48. The filter zone 80 is provided with liquid conduits 84 and 86 for ingress to and egress from the filter zone 80.

The filter system 2B of FIG. 5 is basically similar to the filter system 2B of FIG. 3 comprising three rigid filter plates and two secondary filter zones. It differs from the system 2A mainly in the configuration of some of the rigid filter plates, in means for supporting the plates and in some of the plumbing.

The filter system 2B comprises upper rigid filter plate 4B, upper secondary filter zone 8 with its conduits 16 and 18, intermediate rigid filter plate 76B, lower secondary filter zone 80, lower rigid filter plate 6B, liquid confining chamber 12B and vertical liquid conduit 14B.

The liquid conduit in the embodiments of FIGS. 2 and 3 is a single length of tubing or pipe. In contrast, the conduit 14B of FIG. 5 consists of a plurality of sections 88, 90, 92 and 94 which fit together through V-joints 96 to form the substantially fluid-tight conduit 14B. The different conduit sections 94, etc. are fixed in central holes (unnumbered) in the respective filter plates 4B, etc. by cement, resin, or the like, to form modular units that can be stacked above one another to create the filter zones 8 and 80 therebetween. The lower conduit section 88 may be held on the bottom 50 by being cemented or welded to the ring 97 which is fixed to the bottom 50.

Angle brackets 72, 74 and 78, or equivalent support means, may be used to help support and retain the combinations of filter plates and conduit sections, e.g., plate 4B and conduit section 94, in operating position.

Unlike the embodiments of FIGS. 2 and 3, the system of FIG. 5 has a fluid distribution grid 98 positioned below the bottom filter plate 6B. The grid 98 (see FIG. 6) consists of a series of parallel strips 100 and a series of transverse strips 102 forming a multiplicity of cubical spaces 104 beneath the filter plate 6B. The grid 98 serves to support the plate 6B, thereby replacing the gravel or rock 70. It also serves to evenly distribute air flow upwardly through the filter plate as will be explained hereinafter.

The lower surface 106 of the filter plate 76B is contoured with a plurality of V-shaped grooves 108 that serve, in a manner similar to cubical spaces 104, to help distribute air flow during certain modes of operation of the system 2B up through the filter plate 76B. If desired, filter plate 4B can be similarly contoured. Furthermore, if necessary or desirable for certain types of filtering operations, additional rigid filter plates and attached conduit sections, such as 4B and 94, may be included in the stack to provide additional filter area and secondary filter zones similar to 80 and 8.

The conduit section 88 connects to a source of influent (not shown) to be processed by the filter system 2B.

The airline 110 equipped with control valve 112 enters into the chamber 12B to supply air to the system during the washing mode in the system's use. Chamber 12B is also provided with conduit 20B which is connected via T-joint 114 to liquid inlet line 116, controlled by valve 118 and liquid outlet line 120 controlled by valve 122. Line 116 leads to a source of wash water (not shown) and line 120 leads to the recycle system of a waste water treatment plant (not shown). The use of this plumbing for chamber 12B will be explained hereinafter.

The upper chamber 10 of the filter system 2B is provided with a cover 124 supplied with fluid inlet pipe 126 which permits the filter system 2B to be operated under superatmospheric pressure if desired.

FIG. 1 illustrates a large scale filtering system 200 formed of a multiplicity of filter units as shown in FIG. 2. The system comprises the tank 202 formed with vertical sides 204, base 206 and open top 208. A plurality of upper horizontal rigid filter plates 210 are carried upon a support 212 formed from pieces of angled metal welded or otherwise fixed together and fastened at the edge to the inside vertical surface of tank 202. Additional internal stays or the like (not shown) may be used to strengthen the support 212. The array of filter plates 210 form the bottom of the liquid holding chamber 214 which is further defined by the upper portions 216 of the tank sides 204.

Located beneath the filter plates 210 is an array of lower horizontal filter plates 218 carried upon the support 220 constructed similarly to the support 212. The array of upper filter plates 210 form the top of a secondary filter zone 222 with the array of lower filter plates 218 forming its bottom and the middle portions 224 of the tank sides 204 providing the sides of the filter zone 222.

At the bottom of tank 202 is the liquid containing chamber 226 defined by at the top by the array of filter plates 218, at the bottom by the tank base 206 and at the sides by the lower portions 228 of the tank sides 204. The chamber 226 is packed with crushed stone or gravel 230 which serves, in part, to support the grid 220 and, in turn, the filter plates 218.

Vertical liquid conduits 232 extend from beneath the tank base 206 and rise to approximately the top surfaces 234 of the filter plates 210 through central holes 236 formed in the plates 210. The lower ends 238 of each conduit 232 is joined by a T-joint 240 to a manifold conduit line 242. In the filtering mode for the system 200, lines 242 and conduits 232 deliver influent into the upper chamber 214 from which it filters, in turn, through the filter plates 210, the filter zone 222 and the filter plates 218 passing to the chamber 226 and finally exits via the liquid conduits 244 fitted to the lower portions 228 of tank sides 204.

In the washing mode of the system 200, the rotary sparger means 245 sprays water onto the top surface 234 of the filter plates 210 washing away any accumulated filtrand (not shown) as a slurry or suspension which flows out of the system through the conduits 232 and manifold lines 242. Of course, valves (not shown) are provided on conduits 244 and lines 242 to control the required flow directions during the filtering and washing modes of the filtering system 200.

The secondary filter zone 222 has conduits 246 and 248 fitted to the portions 224 of the tank sides 204. The conduits 246 and 248 provide for ingress to and egress from the chamber 222 of liquid and other materials. Suitable valves and related controls (not shown) are used to regulate flow of materials through conduits 246 and 248. Before the filtering operation of system 200 is begun, the filter zone is charged with particles of filter media. This is accomplished by introducing a slurry or suspension of the filter media particles 250 the zone 222 through the conduits 246. Once charged, such particles may normally remain in the zone 222 through a number of alternate filtering and washing cycles of the system 200. When replacement of particles 250 is required for any reason, they may be removed as a slurry or suspension through conduits 248 and new particles 250 of the same or different type and size may be supplied through conduits 244.

With reference to FIG. 4, the rigid filter plates 300 may be varied in their materials of construction and their precise structure. In their basic form they are formed of particles 302 of filter material fixed in a matrix 304 of cured organic resin. Advantageously, the plates are between about 1 to 5 centimeters in thickness, but in various forms of the plates, e.g., plates 76B and 6B of FIG. 5, they may be 0.5 to 10 centimeters or greater, e.g., up to 30 centimeters in thickness.

The organic resin preferably used as the matrix material 304 for the filter plates 300 is epoxy resin, a generally recognized class of resin material capable of conversion to a cured condition upon suitable admixture. Other resins may be used, e.g., phenol-aldehyde resin, urea-aldehyde resins, polyester resins, resorcinol-aldehyde resins and equivalent curable resins. The matrix component of the filter plates may be varied and depends to some extent upon the aggregate material and its average size. Advantageously, the matrix content of the filter plates will be between about 5 to 50% by weight of the total plate, especially between about 10 to 30%.

The filter material particles comprising the filter plates 300 may be varied in size and substance. Preferably such particles are of relatively uniform size within the range 10 to 18 mesh (standard size), although smaller or larger sizes can be employed for particular filtering operations, e.g., 5 to 35 mesh. These particles preferably constitute 50–95% by weight of the total filter plates.

Crushed anthracite has been found to be particularly useful as the aggregate material. However, other materials may be used including activated carbon, coke, porous ceramic, crushed stone, bank sand, microporous plastic spheres or particles, or the like.

In their basic form, the filter plates 300 have relatively flat surfaces containing small openings or pores as created by molding an admixture of the particles and curable resin between smooth, flat mold plates. However, they may have grooved or other contoured surfaces, e.g., such as surface 108 of plate 76B.

Further variations may be useful. For example, the filter plate 6B was molded to include a tube 306 having holes 308 in its upper surface. This tube may be connected via nipple 310 to the pipe 312 having branch 314 controlled by valve 316 and branch 318 controlled by valve 320. The tube 306 may be used during the washing mode of the system 2B to inject upwardly through plate 6B wash water via line 318 and valve 320, air via line 314 and valve 316 or a mixture of air and water by mixture of streams through lines 314 and 318.

Another modification of the filter plates that has been discovered to be valuable for assisting in the cleaning of the plate surfaces during the wash cycle is illustrated in FIG. 4. Small glass beads 322, e.g., beads having a size between about 30–50 mesh (standard size), are sparsely distributed across the top surface 324 of the filter plate 300. The beads 322 may be applied in varied amount and adhered to the surface 324 with various binders. Advantageously, the beads 322 will be spread on the plate surface 324 so as to occupy between about 0.1 to 20% especially 1 to 5% of the total flat surface area of the plate. The same resin used as the matrix material of the plate 300 may be used to bind the beads 322 to the surface 324, but any durable binder may be used, e.g., the curable resins noted as matrix materials. In place of glass beads, metal shot, resin beads or the like may be used. It has been found that plates having such beaded surface can be washed free of filter cake more readily than similar plates without the beaded coating.

The method of use of the filtering apparatus of the invention can best be described with reference initially to FIG. 2.

With the filter system 2 set up as shown, the chamber 12 would be packed, for example, with No. 10 size crushed stone. Then the operation is begun by loading secondary filter zone 8 with particles P of filter media. Such media can be any of a variety of sizes and/or materials. Preferably the particles are of a size between about ¼" and No. 10 (standard size) and especially between No. 3 and No. 7 mesh. The particles may be, for example, crushed anthracite, coke, activated carbon, porous ceramic or the like.

With filter zone 8 charged with particulate filter media as described, the filter cycle is begun by flowing influent to be filtered via conduits 38, 32 an 14 into chamber 10. During this time, valve 40 is closed to isolate conduit 42 and conduits 16 and 18 are also closed. The influent is introduced at a rate to provide a head of about 3 ft. in chamber 10 and a filter rate through filter plate 4 of about 2 to 5 gallons per square foot of filter plate area per minute. An example of influent is waste water containing, e.g., 10 to 100 mg./l. of suspended solids. The effluent through plate 4 then passes in turn through filter zone 8 and filter plate 6 into chamber 12 from whence it discharges through conduit 20 for disposal, possible chlorination or other handling as required by governmental regulation or otherwise.

As the filtration proceeds, solids suspended in the influent will accumulate on the surface 24 of filter plate 4. Also, some of the finer solids will be held in the interior of the plate 4. Still others will adhere to the particles P in zone 8 and on the surface and interior of filter plate 6. Continued accumulation of the solids in this manner will cause headloss development in the system 2. When this headloss reaches the permitted upper limit, removal of the filter solids from system 2 is accomplished by putting the system into the washing mode.

During the washing cycle, conduits 16 and 18 remain closed so that fluid flow in filter zone 8 will be substantially restricted to the vertical.

Valve 36 is closed to stop the influent flow and chamber 10 is drained. Then, wash water is passed in lines 68 and 64 to the rotary spray 56 to spray water toward plate 4 and dislodge the filter cake from it. Wash water pressure would be, for example, in the range of 5 to 10 lbs/sq. in. The wash water from the sparger 22 will disperse the filter cake (not shown) into a slurry or suspension which will run out of the chamber 10 through the conduit 14 and discharge via conduits 32 and 42 with valve 40 open. Typically, the total amount of wash water suspension will be so small that it can be sent to the activated sludge section of a sewage treatment plant for disposal. Alternatively, the wash water slurry may be handled in separate backwash dewatering equipment or it may be recycled to a waste water treatment plant for admixture with influent to such plant.

Simultaneously or alternatively with the application of wash water via sparger 22, wash water may be introduced through conduit 20 to flow upwardly through filter plate 6, filter zone 8 and filter plate 4 to discharge via conduit 14 as just described. Operation of apparatus of the invention through the wash cycle can be accomplished in about four to six minutes with only about 10 to 15 gallons of water per square foot of surface area of the filter plate 4. This compares with a time of about eight to twelve minutes wash time and water requirements of about 100 to 200 gallons of wash water per square foot of filter surface area in conventional GFM operations. This lower wash water requirement and reduced wash time, of course, substantially improves the efficiency of the filtering operation.

The operation of the filter system 2A is substantially the same as described for system 2. The difference is that filter zone 80 is loaded with particulate filter media in addition to the loading of filter zone 8 as described for system 2. In both systems 2 and 2A, air or a mixture of air and water may be introduced via conduit 20 during the wash cycle in place of simply water as previously described.

The operation of filter system 2B also basically follows that described for systems 2 and 2A. Effluent from chamber 12B discharges via conduits 20B and 120 with valve 122 open for disposal or the like, during the filtering mode while influent enters via conduit 14B. In the washing mode, wash water sprays, as described, from sparger 22 and additional wash water comes in through line 116 with valve 118 open while line 120 is closed by valve 122. Also air is introduced via line 110 by opening valve 112. Air or a mixture of air and water may also be applied through filter plate 6B using tube 306 and lines 312, 314 and 318 as previously noted.

When the filter cycle is stopped, the system 2B can completely drain of liquid so that air will fill the chamber 12B at the beginning of the wash cycle. As water fills the chamber 12B in the first stage of the wash cycle, it will push this air upwardly through filter plate 6B. The natural tendency will be for the air to seek the path of lease resistance anywhere across the area of the plate 6B thereby usually causing undesired channeling. The grid 98 prevents this for as the water rises in chamber 12B, the trapped air is held in the individual cubical spaces 104 thereby creating even distribution of air through the plate 6B. The V-shaped grooves 108 in plate 76B function in a similar manner to provide even distribution of fluid through the plate 76B.

Water will also seek the path of least resistance in passage through the apparatus. Hence, it is advisable to seal joints between different components. This has been discussed relative to conduit 14 and opening 28. Use of O-rings, gaskets, caulking, sealants or the like is also advisable between the peripheral edges of plates, such as 4, 6, etc., and the tank wall sections 44, 46, etc. In place of the V-joints between conduit sections 90, 92 and 94, it is possible to use threaded couplings, O-ring couplings or the like. In order to avoid corrosion from organic acids that are frequently present in waste water effluents, use of stainless steel and glass fiber reinforced plastics is recommended for fabrication of tanks and other parts.

CONCLUSION

Although the new methods and apparatus have been mainly discussed relative to waste water effluent filtering, they are usable for a variety of other applications including potable surface water treatment, dewatering activated sewage sludge, etc.

An important advantage of the new apparatus and methods, in addition to a great reduction in backwash volume requirements is their ability to operate at low influent head, e.g, 2 to 3 ft. of liquid head in chamber 10, etc. This permits the equipment to operate by gravity off the top of settling tanks thereby eliminating the expense of pumping influent up to a head of about 10 ft. as with conventional GMF operations. Also, since wash water is discharged directly from the top filter plate, e.g., surface 24 of plate 4, there is no need to rise it up to conventional wash water troths. In some applications, it is necessary only to wash the top plate with the sparger after which the filtering mode can be resumed. The primary purpose of wash water in the new operations is not to provide scouring action and expansion of media as with conventional GM filters, but to slurry the filter cake and carry it out the vertical conduit. Air supplied to the secondary filter zones can provide scouring needed to loosen adherent solids from the particulate filter media. Great wash water reduction is achieved and no intermixing of media will result.

An advantage of having several filtering zones is to utilize each zone to remove a particular size or type of LCSS. Larger sizes are captured on the top of the first RFM with each succeeding zone capturing smaller particles or different physical and/or chemical constitutents.

The embodiments of the invention in which an exclusive property or privilege is claimed are defined as follows:

1. Apparatus for removal of fine organic solids from aqueous suspensions which comprises:
   an upper rigid horizontal filter plate,
   a lower rigid horizontal filter plate,
   said filter plates being formed of aggregate fixed in a matrix of cured organic resin,
   a secondary filter zone capable of retaining therein a mass of particles of filter material, said zone being defined at the top by said upper filter plate, at the bottom by said lower filter plate and on the sides by solid side walls,
   a first chamber to contain liquid above said upper plate, the base of said first chamber being said upper plate,
   a second chamber to contain liquid below said lower plate, the roof of said second chamber being said lower plate,
   a hole extending vertically through said upper filter plate,
   a vertical conduit having a horizontal cross-section substantially corresponding to the size of said hole, said conduit being positioned at its upper end in said hole,
   the combination of said hole and conduit consisting essentially of the means by which (a) liquid influent is introduced during the filtering mode of said apparatus into said first chamber from a source external of said apparatus and (b) wash water is removed from said first chamber during the washing mode of said apparatus,
   first and second liquid conduits for inlet and outlet of liquid to and from said secondary filter zone,
   third and fourth liquid conduits for inlet and outlet of liquid to and from said second chamber, and
   a sparger to spray wash water on the top surface of said upper filter plate.

2. The apparatus of claim 1 wherein said rigid filter plates are formed of anthracite of between about 10 to 18 mesh size and said organic resin is an epoxy resin.

3. The apparatus of claim 2 wherein the top surface of at least said upper filter plate has adhered thereto a sparse coating of glass beads of between about 30 to 50 mesh size.

4. The apparatus of claim 3 wherein said filter plates are between about 1 to 5 centimeters in thickness.

5. The apparatus of claim 1 wherein there are a plurality of said holes in said upper filter plate, each hole having associated therewith one of said vertical conduits.

* * * * *